United States Patent [19]

Wade

[11] Patent Number: 5,043,537

[45] Date of Patent: Aug. 27, 1991

[54] SEALING CABLE JUNCTIONS

[75] Inventor: Philip J. Wade, Frome Somerset, United Kingdom

[73] Assignees: Fujikura Ltd., Tokyo, Japan; Alh Systems Limited, Wiltshire, United Kingdom

[21] Appl. No.: 423,991

[22] Filed: Oct. 19, 1989

[30] Foreign Application Priority Data

Oct. 21, 1988 [GB] United Kingdom ............... 8824655

[51] Int. Cl.⁵ .................................................. H02G 15/08
[52] U.S. Cl. ................................. 174/84 R; 174/77 R; 174/88 R; 174/DIG. 8
[58] Field of Search ................. 174/77 R, 84 R, 88 R, 174/DIG. 8

[56] References Cited

U.S. PATENT DOCUMENTS

| | | | |
|---|---|---|---|
| 4,400,579 | 8/1983 | Nolf | 174/84 R |
| 4,590,328 | 5/1986 | Kunze | 174/88 R |
| 4,689,474 | 8/1987 | Overbergh et al. | 174/DIG. 8 X |
| 4,693,767 | 9/1987 | Grzanna et al. | 174/88 R X |
| 4,734,543 | 3/1988 | Nolf | 174/84 R X |

FOREIGN PATENT DOCUMENTS

| | | | |
|---|---|---|---|
| 151512 | 8/1985 | European Pat. Off. | 174/DIG. 8 |
| 0265259 | 4/1988 | European Pat. Off. | |
| 1594818 | 8/1981 | United Kingdom | |
| 2198594 | 6/1988 | United Kingdom | |

*Primary Examiner*—Morris H. Nimmo
*Attorney, Agent, or Firm*—Sprung Horn Kramer & Woods

[57] ABSTRACT

An insert part for sealing a cable junction having a flange of heat-conductive material and a block of heat-fusable material connected to the flange also has a support member, preferably of heat-conductive material, projecting from the block. The support member has a part within the block shaped to provide a pair of opposed concave surfaces, positioned so that the concave surfaces open in opposite directions. The block may comprise a relatively thick central part and webs extending outwardly from the corners of that central part. Preferably, two flanges are provided, one on each side of the support member.

18 Claims, 3 Drawing Sheets

SEALING CABLE JUNCTIONS

BACKGROUND OF THE INVENTION

1. Field of the Invention

The present invention relates to the sealing of cable junctions when it is decided to form a gas-tight enclosure around the junction, and when the means for supplying that enclosure is an envelope of heat-shrinkable material. It is particularly, but not exclusively, concerned with the sealing of branch junctions of electric or communication cables.

2. Summary of the Prior Art

In UK patent application GB 2198594A, jointly in the names of ourselves and Fujikura Ltd., we described an arrangement for sealing cable junctions in which one or more insert parts were positioned between a pair of branch cables. The insert part had a block of heat-fusible material, and one or more flanges of heat-conductible material. The flanges each had a tongue which extended into the block. A heat-shrinkable envelope was then positioned around the branch cable, and the insert part(s) and the envelope was then shrunk by the application of heat. That heat caused the block material to fuse, which process was assisted by heat conduction via the tongues of the flange(s). Thus the space within the envelope, around the branch cables, was filled by fused block material, so that a seal was achieved. The flanges of the insert part also assisted in the positioning of the insert part, as they could be wrapped around the branch cables.

In GB 2198594A we described several embodiments of insert parts for achieving the above result. In that specification, we said that where the branch cables had a large diameter, it would be necessary to provide several insert parts to achieve the desired melting of the material of the blocks of those insert parts.

We also described another embodiment in which there was one block, but several flanges.

In all of these cases, the flange was a simple "T"-shape, with the leg of the "T" forming the tongue extending into the block for heat conduction.

We have now investigated further the problem of sealing junctions of very large cables, and it has been found that the provision of a plurality of insert parts, as described in 2198594A is not wholly satisfactory.

SUMMARY OF THE INVENTION

The present invention, therefore, is concerned with a development of the insert part of GB 2198594A, particularly, but not exclusively, for large cables. Therefore, in addition to the block and flange, or flanges, the present invention proposes that the insert part has a support member of e.g. metal projecting from the block, which support member has a part within the block shaped to provide a pair of opposed concave surfaces, positioned so that the concave surfaces open in opposite directions.

Investigation has found that, with large cables of e.g. 75 mm diameter, there is a risk that the material of the block will flow out of the gap between the cables when the block is fused. During this stage, the block material is substantially liquid and the insert parts of GB 2198594A depend on block material remaining between the cables for there to be no gaps between the cables, to achieve a satisfactory seal. The tongues of the flanges do not restrict flow, and their volume is insignificant.

The part within the block of the support member of the present invention has several functions. Firstly, its volume is significant in relation to the volume of the block itself. This is preferably at least 40%, preferably 50%. Thus, there is less block material which fills the space between the cables and a significant proportion of that space is filled by that part of the supporting member. There is thus less risk of gaps developing between the cables. The presence of the curved surfaces assists in conforming the shape of the block to the cables.

Secondly, the curved surfaces ensure that heat is conducted to parts of the block remote from the projecting part of the support member, both transverse and parallel to the direction of the plane joining the centres of the cables. Thirdly, the curved surfaces may, at least to some extent, restrict flow of block material transverse to the plane joining the centres of the cables, when the block is being fused.

It should be noted that, since a standard size support member may be used, the part of the support member within the block may project beyond the theoretical tangential lines joining the cables. e.g. when the cables have a smaller diameter that the width of the part of the support member within the block. This is acceptable, since the envelope will conform to the edges of the part of the support member within the block and the block material will fill the space within the envelope.

In a further development of the present invention, the block consists of a central, relatively thick, part and at least one thinner web of block material projecting from either side of that central part. The reason for this is the webs will then melt relatively quickly, which is important as these will be the parts of the block first contacted by the shrinking envelope. This idea of having the block with a central thick part, and thinner webs at the sides, was discussed in more detail in application 2198594A.

Preferably, two flanges are provided, one on each side of the support member, so that the insert part may be attached to both branch cables. The flanges and the support member are normally made of heat-conductive material, whilst the block is made of heat-fusible material.

BRIEF DESCRIPTION OF THE DRAWINGS

An embodiment of the invention will now be described in detail, by way of example, with reference to the accompanying drawings, in which.

DETAILED DESCRIPTION

Figure 1:
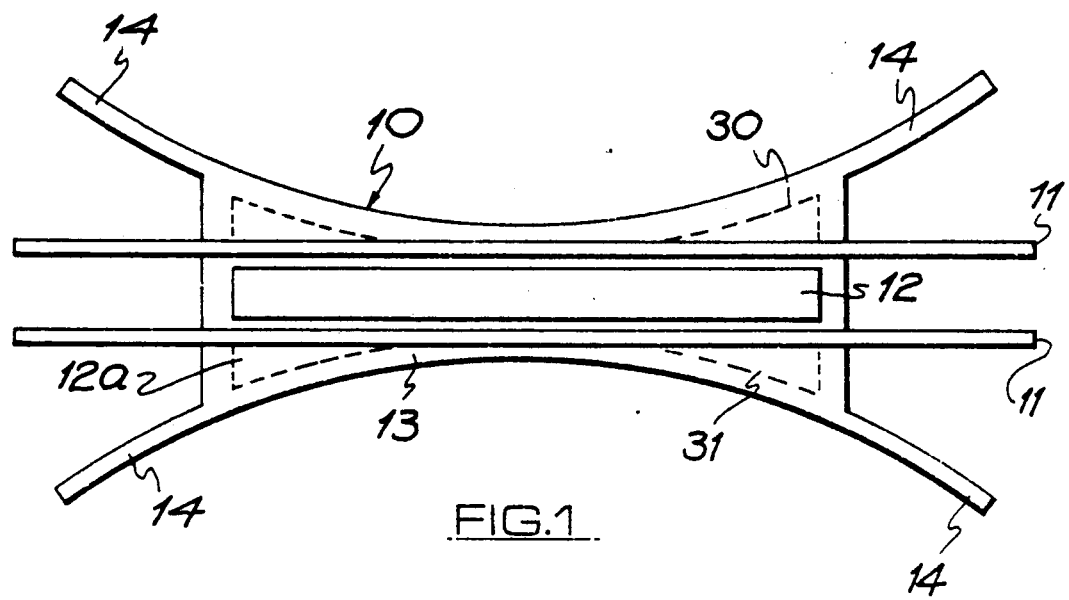
FIG. 1 shows an end view of an insert part according to the present invention.

Referring first to FIG. 1, the embodiment of the insert part illustrated has a block 10 of heat-fusible material into which is embedded a pair of flanges 11 and a support member 12. As can be seen in FIG. 1, the support member 12 is positioned between the flanges 11. Although this cannot be seen in FIG. 1, the flanges 11 consist of a "T"-shaped piece of heat-conductive material, such as aluminium, the leg of the "T" (which is not visible in FIG. 1) forming a tongue extending into the block 10. Holes may be provided in the tongue of the flange 11, to assist in the bonding of that tongue to the block material. FIG. 1 also shows that the block 10 comprises a relatively thick central part 13 and webs 14 extending outwardly from the corners of that central part 13.

Figure 2:
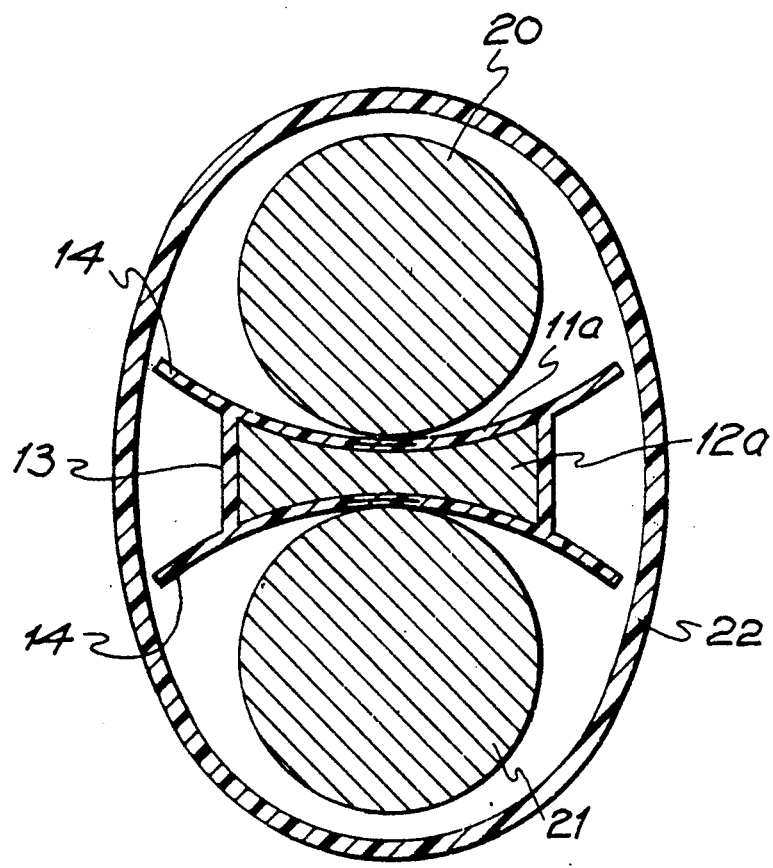
FIG. 2 shows a cross-sectional view through an insert part according to the present invention, when mounted between a pair of branch cables.
Figure 4:
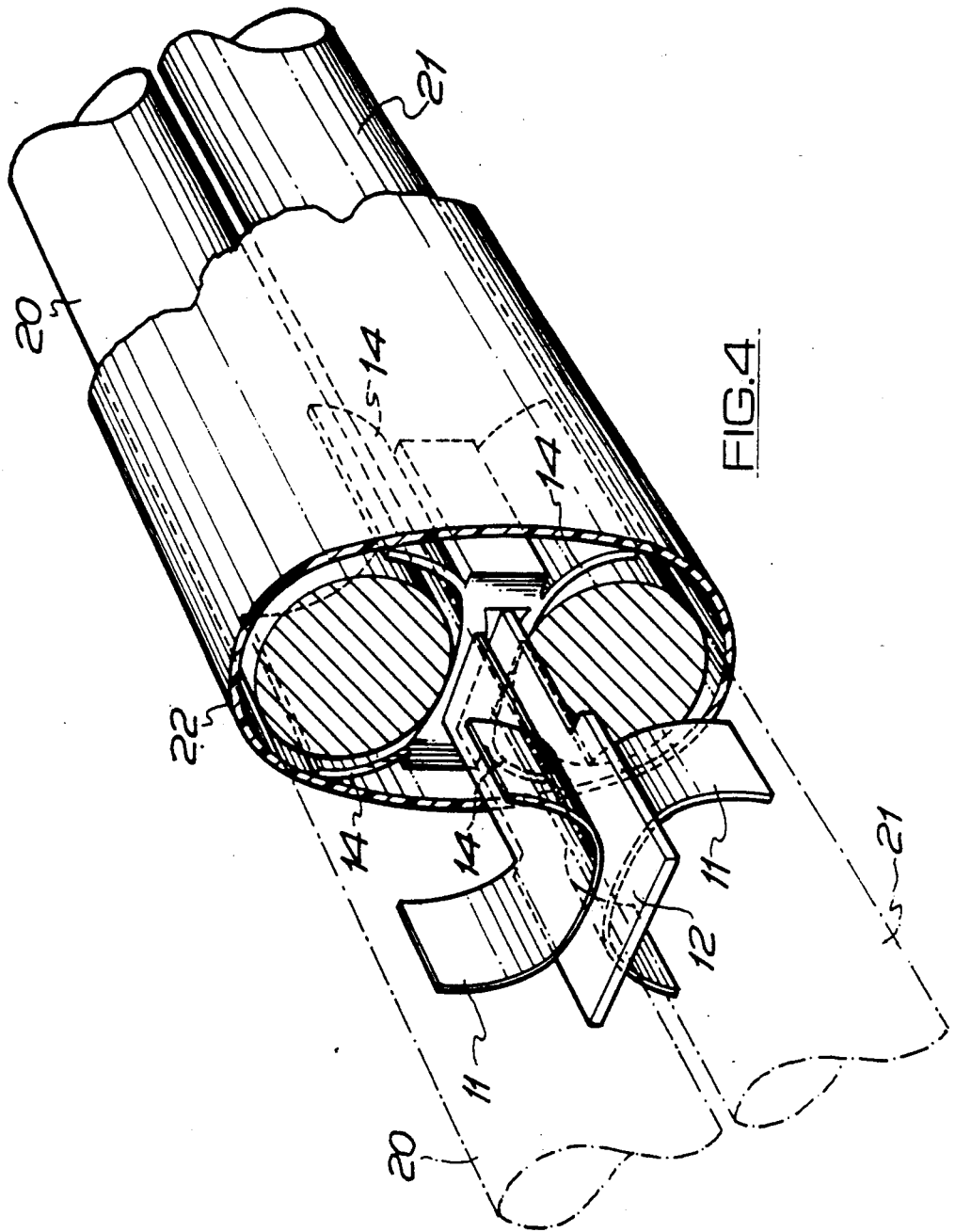
FIG. 4 shows a perspective view of an insert part according to the present invention when mounted between a pair of branch cables.

FIG. 2 shows the insert part of FIG. 1 inserted between a pair of branch cables 20,21. As this is a sectional view, the figure shows the tongues 11a of the flanges 11 within the block 13 and also the part 12a of the support member 12 within the block. The branch cables 20 and 21, and the insert part, are surrounded by a heat-shrinkable envelope 22. On the application of heat, this envelope 22 shrinks. As it does so, the flanges 11 and support member 12 conduct heat to the block 10 which melts and fuses to the branch cables 20,21, and to the interior of the envelope 22. Since the webs 14 are relatively thin, they melt first and it is only as the envelope begins to conform to the theoretical tangential lines joining the branch cables 20,21 that the central part 13 of the block 10 is fused. The result of this is that the space within the envelope, surrounding the branch cables, is filled with material from the block 10, thereby sealing the cable junction. FIG. 4 shows the arrangement of FIG. 2 in perspective.

Except for the presence of the support member 12, the insert part, and sealing operation discussed above, is generally similar to that disclosed in GB 2198594A. Although the shape of the block 10 illustrated in FIG. 1 is not the same as any of the embodiments of GB 2198594A, its function is the same. Therefore, alternative block and flange shapes may be used, as described in GB 2198594A, without departing from the present invention. As was mentioned above, it is possible to have holes in the tongue 11a of the flange 11, to assist in securing the material of the block 10 to the tongue 11a of the flanges 11, and it is also possible to provide spots of an temperature-indicating paint (heat-sensitive paint) on the flanges 11. Also, although it cannot be seen from FIG. 2, the flanges 11 may be wrapped at least partially around the branch cables, to secure the insert part to those cables, again as was described in GB 2198594A.

Figure 3:
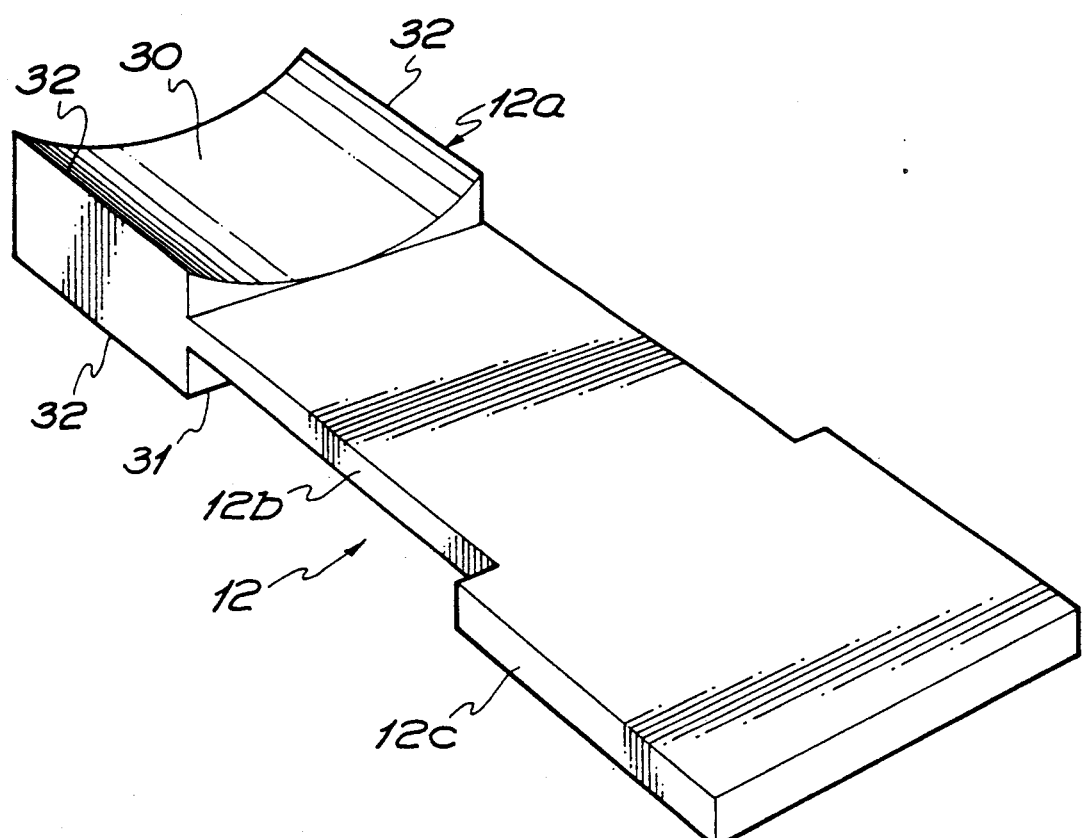
FIG. 3 shows a support member for use in an insert part according to the present invention.

The most significant difference, however, between the insert part of the present invention and those discussed in GB 2198594A is the presence of the support member 12. This support member 12 is shown in more detail in FIG. 3, and it can be seen that it comprises three parts. The first part 12a is embedded within the block 10, the second part 12b extends from that first part outwardly from the block and should be long enough to project from the end of the heat-shrinkable envelope so that heat applied to the exterior of that envelope is also applied to the end part 12c of the support member 12, so that heat is conducted along the support member 12 to assist in melting the block. As illustrated in FIG. 3, the end 12c of the support member is wider than the middle part 12b, since this improves the amount of heat taken up when a heat source such as a flame is applied to shrink the envelope. This is not necessary, however, and the end part 12c may be the same width as the part 12b.

As can be seen from FIG. 3, however, the part 12a of the support member 12 within the block has a pair of concave surfaces 30,31, located so that they open in opposite directions. Thus, the extreme edges 32 of those surfaces 30,31 project deep into the central part 13 of the block 10, as can be seen in FIG. 1 where the curved surfaces 30,31 are indicated by dotted lines. This has the primary function of causing the part 12a of the support member 12 to act as a solid filler between the branch cables 20,21. There is therefore less risk of gaps developing in the seal between those branch cables 20,21 as the volume of block material between those branch cables 20,21 is small. Also, the part 12a of the support member 12 improves the heat conduction to the interior of the block. In the embodiments of the insert part described in GB 2198594, the tongue of the insert part within the block was not thickened in this way.

This shaping of the part 12a of the support member 12 within the block has a second function. As can be seen from FIG. 2, the surfaces 30,31 open outwardly towards the respective branch cables 20,21 and it is found this has the effect of at least partially restricting the flow of block material as it fuses. As a result, there is less likelihood of block material flowing out from the space between the branch cables, both laterally and in a direction generally parallel to the axes of the branch cables, and this ensures that enough block material is retained to achieve a satisfactory seal.

Thus, by the provision of the support member 12 with opposed concave surfaces 30,31, the formation of a seal for very large cables can be improved, as compared with the embodiments discussed in GB 2198594A.

What is claimed is:

1. An insert part for sealing a cable junction, comprising:
   a said block of heat-fusible material;
   a flange and a further flange; said flange and said further flange being of heat-conductive material connected to said block; and
   a support member projecting from said block, said support member having a filler part of non-heat fusible material within said block, said filler part being shaped so as to provide a pair of opposed concave surfaces positioned such that said concave surfaces open in opposite directions; wherein said flange is on one side of said support member and said further flange is on the other side of said support member.

2. An insert part according to claim 1, wherein the block comprises a central, relatively thick, part and at least one thinner web of block projecting from each side of said central part.

3. An insert part according to claim 2, having a plurality of said thinner webs extending outwardly from the corners of the central part.

4. An insert part according to claim 1, wherein the support member is of heat-conductive material.

5. An insert part according to claim 1, said flange has a tongue, is connected to the block by a tongue extending into the block.

6. An insert part according to claim 1, wherein the support member also comprises a projecting part extending from the filler part outwardly from the block and a part extending from the projecting part, the further part being wider than the projecting part.

7. An insert part according to claim 1, wherein the ratio of the volume of the filler part of the support member to the volume of the block is at least 40%.

8. An assembly comprising:
   an insert positioned between the junction of a first and a second cable, the insert having an insert part comprising a block of heat-fusible material;
   a flange and a further flange; said flange and said further flange being of heat-conductive material connected to said block; and a support member projecting from said block, said support member having a filler part of non-heat fusible material within said block, said filler part being shaped so as to provide a pair of opposed concave surfaces positioned such that said concave surfaces open in opposite directions, the insert part being attached to at least one of the first and second cables with the block of the insert part between the first and second cables said flange being on one side of said support member and said further flange is on the other side of said support member; and a heat-shrinkable envelope around the cables, at least a part of the block being within the envelope.

9. An assembly according to claim 8 wherein the block projects beyond the theoretical tangential lines joining the cables.

10. An assembly according to claim 8 wherein the filler part has a projecting part extending therefrom and said projecting part projects beyond an end of the heat-shrinkable envelope.

11. A method of sealing a cable junction, comprising:
positioning an insert between first and second branch cables, said insert comprising
a block of heat-fusible material;
a flange and a further flange; said flange and said further flange being of heat-conductive material connected to said block; and
a support member projecting from said block, said support member having a filler part of nonheat fusible material within said block, said filler part being shaped so as to provide a pair of opposed concave surface positioned such that said concave surfaces open in opposite directions, said flange being on one side of said support member and said further flange is on the other side of said support member,
surrounding the first and second branch cables of the junction with a heat-shrinkable envelope; and
shrinking the envelope around the branch cables, by the application of heat; wherein the concave surfaces open towards the first and second branch cables, respectively, the insert part being attached to a corresponding one of the first and second branch cables, the application of heat also causing fusion of the block.

12. An insert part for sealing a cable junction, comprising:
a block of heat-fusible material;
a flange of heat-inductive material connected to said block; and
a support member projecting from said block, said support member having a filler part of non-heat fusible material within said block, said filler part being shaped so as to provide a pair of opposed concave surfaces positioned such that said concave surfaces open in opposite directions;
wherein said flange has a tongue, and said flange is connected to the block by said tongue extending into the block.

13. An insert part for sealing a cable junction, comprising:
a block of heat-fusible material;
a flange of heat-inductive material connected to said block; and
a support member projecting from said block, said support member having a filler part of non-heat fusible material within said block, said filler part being shaped so as to provide a pair of opposed concave surfaces positioned such that said concave surfaces open in opposite directions;
wherein the support member also comprises a projecting part extending from the filler part outwardly from the block and a part extending from the projecting part, the further part being wider than the projecting part.

14. An assembly for sealing a junction between at least first and second cables comprising:
an insert positioned between the junction of a first and a second cable, the insert having an insert part comprising a block of heat-fusible material;
a flange of heat-conductive material connected to said block; and
a support member projecting from said block, said support member having a filler part of non-heat fusible material within said block, said filler part being shaped so as to provide a pair of opposed concave surfaces positioned such that said concave surfaces open in opposite directions, the insert part being attached to at least one of the first and second cables with the block of the insert part between the first and second cables; and
a heat-shrinkable envelope around the cables, at least a part of the block being within the envelope;
wherein the filler part has a projecting part extending therefrom and which projecting part projects beyond an end of the heat-shrinkable envelope.

15. A method of sealing a cable junction, comprising:
positioning an insert between first and second branch cables, said insert comprising
a block of heat-fusible material;
a flange of heat-conductive material connected to said block; and
a support member projecting from said block, said support member having a filler part of nonheat fusible material within said block, said filler part being shaped so as to provide a pair of opposed concave surfaces positioned such that said concave surfaces open in opposite directions,
surrounding the first and second branch cables of the junction with a heat-shrinkable envelope; and
shrinking the envelope around the branch cables, by the application of heat; wherein the concave surfaces open towards the first and second branch cables, respectively, the insert part being attached to a corresponding one of the first and second branch cables with the block of the insert part between the first and second branch cables, the application of heat also causing fusion of the material of the block;
wherein said flange has a tongue and said flange is connected to the block by said tongue extending into the block.

16. A method of sealing a cable junction, comprising:
positioning an insert between first and second branch cables, said insert comprising
a block of heat-fusible material;
a flange of heat-conductive material connected to said block; and
a support member projecting from said block, said support member having a filler part of nonheat fusible material within said block, said filler part being shaped so as to provide a pair of opposed concave surfaces positioned such that said concave surfaces open in opposite directions,
surrounding the first and second branch cables of the junction with a heat-shrinkable envelope; and shrinking the envelope around the branch cables, by the application of heat; wherein the concave surfaces open towards the first and second branch cables, respectively, the insert part being attached to a corresponding one of the first and second branch cables with the block of the insert part between the first and second branch cables, the application of heat also causing fusion of the material of the block;

wherein the filler part of the support member has a projecting part extending therefrom which further part projects beyond an end of the heat-shrinkable envelope.

17. A method of sealing a cable junction, comprising:

positioning an insert between first and second branch cables, said insert comprising a block of heat-fusible material;

a flange of heat-conductive material connected to said block; and a support member projecting from said block, said support member having a filler part of nonheat fusible material within said block, said filler part being shaped so as to provide a pair of opposed concave surfaces positioned such that said concave surfaces open in opposite directions, surrounding the first and second branch cables of the junction with a heat-shrinkable envelope; and shrinking the envelope around the branch cables, by the application of heat; wherein the concave surfaces open towards the first and second branch cables, respectively, the insert part being attached to a corresponding one of the first and second branch cables with the block of the insert part between the first and second branch cables, the application of heat also causing fusion of the material of the block;

wherein the filler part of the support member has a projecting part extending therefrom which further part projects beyond an end of the heat-shrinkable envelope; wherein the support member (12) of the insert part also comprises a further part extending from the projecting part, the further part being wider than the projecting part.

18. A method of sealing a cable junction, comprising:

positioning an insert between first and second branch cables, said insert comprising a block of heat-fusible material;

a flange of heat-conductive material connected to said block; and a support member projecting from said block, said support member having a filler part of nonheat fusible material within said block, said filler part being shaped so as to provide a pair of opposed concave surfaces positioned such that said concave surfaces open in opposite directions, surrounding the first and second branch cables of the junction with a heat-shrinkable envelope; and shrinking the envelope around the branch cables, by the application of heat; wherein the concave surfaces open toward the first and second branch cables, respectively, the insert part being attached to a corresponding one of the first and second branch cables with the block of the insert part between the first and second branch cables, the application of heat also causing fusion of the material of the block;

wherein the material of the block of the insert part has a higher melt flow index and a lower melting point than the material of the envelope.

* * * * *